United States Patent
Chaffee (10) Patent No.: US 9,323,235 B2
(45) Date of Patent: Apr. 26, 2016

(54) INDUSTRIAL CONTROL SYSTEM WITH DISTRIBUTED MOTION PLANNING

(75) Inventor: Mark Chaffee, Chagrin Falls, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 283 days.

(21) Appl. No.: 13/443,591

(22) Filed: Apr. 10, 2012

(65) Prior Publication Data

US 2012/0256566 A1  Oct. 11, 2012

Related U.S. Application Data

(60) Provisional application No. 61/474,027, filed on Apr. 11, 2011, provisional application No. 61/474,042, filed on Apr. 11, 2011, provisional application No. 61/474,054, filed on Apr. 11, 2011, provisional application No. 61/474,073, filed on Apr. 11, 2011.

(51) Int. Cl.

| | |
|---|---|
| *H02P 1/54* | (2006.01) |
| *H02P 5/00* | (2006.01) |
| *G05B 19/00* | (2006.01) |
| *G05B 15/02* | (2006.01) |
| *G05B 19/05* | (2006.01) |
| *G05B 19/414* | (2006.01) |
| *G06F 13/12* | (2006.01) |
| *G05B 23/02* | (2006.01) |

(52) U.S. Cl.
CPC .............. *G05B 15/02* (2013.01); *G05B 19/056* (2013.01); *G05B 19/4148* (2013.01); *G05B 23/0205* (2013.01); *G06F 13/124* (2013.01); *G05B 2219/21012* (2013.01); *G05B 2219/24015* (2013.01)

(58) Field of Classification Search
None
See application file for complete search history.

(56) References Cited

U.S. PATENT DOCUMENTS

| | | | | |
|---|---|---|---|---|
| 5,162,986 A * | 11/1992 | Graber et al. | ................... | 700/17 |
| 5,485,620 A * | 1/1996 | Sadre et al. | ..................... | 717/162 |
| 6,650,078 B1 * | 11/2003 | Chaffee | ......................... | 318/630 |
| 7,853,645 B2 * | 12/2010 | Brown et al. | ................. | 709/203 |
| 7,904,284 B2 * | 3/2011 | Engelke et al. | ................. | 703/11 |
| 2007/0058929 A1 * | 3/2007 | Chaffee | ........................... | 386/78 |
| 2010/0010671 A1 * | 1/2010 | Miyamoto | .................... | 700/247 |

* cited by examiner

*Primary Examiner* — Eduardo Colon Santana
*Assistant Examiner* — Devon Joseph
(74) *Attorney, Agent, or Firm* — Boyle Fredrickson, S.C.

(57) ABSTRACT

An industrial control system provides motion control functions that may distribute motion planning tasks to capable motor drives and motion devices based on stored drive profiles. The profile-aware functions allow control programs to be used with motor drives that are both capable and incapable of executing a motion planning with automatic distribution of the planning tasks as appropriate. Coordination among different devices in the industrial control system when motion planning is distributed may be accommodated through peer-to-peer communication between drives and non-controller devices.

26 Claims, 7 Drawing Sheets

INDUSTRIAL CONTROL SYSTEM WITH DISTRIBUTED MOTION PLANNING

CROSS-REFERENCE TO RELATED APPLICATIONS

This application claims priority to the following U.S. provisional applications, each filed Apr. 11, 2011: Ser. Nos. 61/474,027; 61/474,042; 61/474,054; 61/474,073. The entire content of each provisional application is incorporated herein by reference.

BACKGROUND OF THE INVENTION

The present invention relates to industrial control systems for controlling the position and/or velocity of electric motors in real time and in particular to an industrial controller allowing motion planning for such drives to be distributed to the drives from the central controller.

Industrial controllers are specialized computer systems used for the control of industrial processes or machinery, for example, in a factory environment. Generally, an industrial controller executes a stored control program that reads inputs from a variety of sensors associated with the controlled process and machine and, sensing the conditions of the process or machine and based on those inputs and a stored control program, calculates a set of outputs used to control actuators controlling the process or machine.

Industrial controllers differ from conventional computers in a number of ways. Physically, they are constructed to be substantially more robust against shock and damage and to better resist external contaminants and extreme environmental conditions than conventional computers. The processors and operating systems are optimized for real-time control and are programmed with languages designed to permit rapid development of control programs tailored to a constantly varying set of machine control or process control applications.

Generally, the controllers have a highly modular architecture, for example, that allows different numbers and types of input and output modules to be used to connect the controller to the process or machinery to be controlled. This modularity is facilitated through the use of special "control networks" suitable for highly reliable and available real-time communication. Such control networks (for example, ControlNet EtherNet/IP) differ from standard communication networks (e.g. Ethernet) by guaranteeing maximum communication delays by pre-scheduling the communication capacity of the network, and/or providing redundant communication capabilities for high-availability.

As part of their enhanced modularity, industrial controllers may employ I/O modules dedicated to a particular type electrical signal and function, for example, detecting input AC or DC signals or controlling output AC or DC signals. Each of these I/O modules may have a connector system allowing them to be installed in different combinations in a housing or rack along with other selected I/O modules to match the demands of the particular application. Multiple or individual I/O modules may be located at convenient control points near the controlled process or machine to communicate with a central industrial controller via the special control network.

One type of I/O module is a motor drive that may communicate with the industrial controller that is executing motion instructions, and may provide electrical signals to an electric motor adjusting the position or velocity of the motor according to the motion instructions. An example motion instruction, when executed by the controller, may initiate movement of the motor between the first and second position within predefined constraints of velocity and acceleration. The motion instruction command may be received by a motion planner in the industrial controller which, based on the motion instruction data, generates a motion profile precisely describing the motion of the motor on an instant by instant basis to control speed and acceleration changes, for example, to limit "jerk", the first derivative of acceleration, the latter which may produce undesired wear on the motor and attached components.

Motion control in an industrial control environment is extremely demanding on the controller and the communication network because of the high rate of data transfer necessary to generate and convey the motion profiles for a multiplicity of high-speed motors. This problem is lessened to some extent by sending a coarse version of the motion profile data from the controller to the drive, the coarse version having a relatively slow coarse update rate with reduced bandwidth requirements. The drive may then interpolate a higher resolution version of the motion profile providing for smooth precise motion. Even with this approach, the coarse update rate must be high enough for these drives to meet performance requirements, so the controller's data processing capacity and control network bandwidth may be exhausted when handling a large number remote drives.

One solution to this problem is distributing the motion planning tasks to the drives themselves. This can be done by inserting into the control program special instructions that, when executed, cause the industrial controller to transmit the necessary commands to activate motion planning in the drives.

SUMMARY OF THE INVENTION

The present invention allows motion planning to be distributed among hardware devices in a manner that is largely invisible to the programmer preparing the control program, allowing a single control program to serve multiple hardware installations. This invention provides this feature by modifying the motion control functions in the industrial controller so that they determine whether a particular motor drive can implement motion planning, and if so communicate motion commands directly with the motion planner in the motor drive, and if not communicate the motion commands with a motion planner within the industrial controller. By modifying the existing motion functions in the industrial controller, special motion control instructions are not required in the control program.

Some embodiments of the present invention also permit peer-to-peer communication between the drive implementing the motion planner and other components which serves to facilitate distributed motion control. These embodiments may further provide for event driven communication allowing fast response time with low network burden for time critical motion information.

Specifically, the present invention may provide an industrial controller having a network interface adapted to communicate with one or more connected motor drives and an electronic computer communicating with the network interface and executing a stored program, for example firmware, to receive a control program providing motion control instructions. The motion control instructions may be executed by identifying a motor drive associated with the motor instruction and determining whether the identified motor drive is capable of executing a motion planner, the motion planner providing a time series of motion data for controlling a motor upon a motion command by the motion control instruction. If this capability exists the industrial controller transmits the motion command to the identified motor drives over the network interface to the identified drive, otherwise the industrial controller transmits the motion command to a motion planner in the industrial controller.

It is thus a feature of at least one embodiment of the invention to allow an individual to create a control program with motion instructions without regard to the distribution of the motion planning functions among drives. It is another feature of at least one embodiment of the invention to allow a single control program to work universally with different types of motor drives.

The control program instructions may be executed by calls to functions stored in the industrial controller independent of the control program, for example, as firmware.

It is thus a feature of at least one embodiment of the invention to provide a distribution of motion planning as a function of the industrial controller hardware without the need for special compilation or other pre-modification to the control program itself.

The network interface may be adapted to implement connected messaging between the controller and the motor drives, pre-allocating network communication capacity among connections. The electronic computer executes the stored program to open connections between the controller and the drives for communication of motion commands or motion data.

It is thus a feature of at least one embodiment of the invention to decrease not only the burden to the controller in performing motion planner computations for one or more associated drives but also to decrease the network traffic and thus the need for large allocations of controller data processing capacity and communication capacity between an industrial controller and these drives.

With respect to communications capacity, the electronic computer may allocate a first portion of the network communication capacity to communication with a motor drive capable of executing a motion planner that is less than a second portion of the network communication capacity allocated to communicate with a motor drive not capable of executing the motion planner.

It is thus a feature of at least one embodiment of the invention to tailor network capacity according to drive capabilities allowing for a reduced burden on the network even in environments with mixed legacy and motion-planning capable drives.

The first portion of the network communication capacity may provide a combination of periodic and event driven data transfer, the latter as triggered by the generation of a motion command and the second portion of the network communication capacity may be periodic data transfer according to a predefined interval of motion data.

It is thus a feature of at least one embodiment of the invention to provide rapid response to motor related commands even when relatively low network capacity is allocated. The use of aperiodic transmissions allows rapid response to motion commands, eliminating unnecessary periodic communication.

The industrial controller may include a drive profile indicating whether each motor drive includes a motion planner in firmware. The drive profile may be used by the industrial controller to determine whether the identified motor drive is capable of executing a motion.

It is thus a feature of at least one embodiment of the invention is to provide a simple method of automatically determining the capability of motor drives, using common data structures such as a drive profile within an industrial control.

It will be similarly understood, that the present invention may provide a motor drive that may work with the above described industrial controller where the motor drive includes a switching circuit for synthesizing power voltage to a motor, a network interface for communicating with an industrial controller, and an electronic computer communicating with the switching circuit and the network interface and executing a stored program, for example firmware. The stored program may allow a motor drive to receive a motion command from an industrial controller over the network interface, the motion command indicating execution of a motion instruction by the industrial controller and, in response to the motion command, generate a time series of motion data for the switching circuit using a motion planner. Upon completion of the motion profile, the motor drive may communicate with the industrial controller to indicate completion of a motion profile.

It is thus a feature of at least one embodiment of the invention to permit distributed motion planning while providing close coordination with instructions retained in the industrial controller that are dependent upon completion of the motion instruction.

The motion planner may be stored in firmware in the motor drive.

It is thus a feature of at least one embodiment of the invention to eliminate the need for special motion instructions in the control program either to configure the motor drive or to implement distributed motion planning.

The electronic computer may further execute the stored program to implement connected messaging from a non-controller device to one or more non-controller devices to produce a time series of motion data to the consuming devices.

It is thus a feature of at least one embodiment of the invention to provide distributed motion planning without incurring extra overhead in forwarding motion data to the industrial controller and then back down to other devices requiring this motion data, for example, for synchronization purposes. By allowing peer-to-peer communication between the motor drive and other non-controller devices, extra network traffic and data transfer delay may be reduced.

The electronic computer may further execute the stored program to load and execute instructions from the control program that are not motion instructions but are interdependent with the motion instructions. It is thus a feature of at least one embodiment of the invention to reduce time critical coordination signals between standard control instructions and associated motion control instructions when motion planning is distributed to a drive.

It will be generally understood that the invention substantially reduces the required controller data processing effort and network bandwidth for remote motion control by distributing a motion planning component (generating motion profiles from motion instruction commands) to the motor drives themselves, while maintaining, if not improving overall system performance. In this way, the motion data need not be transmitted over the network but only the higher-level motion command that initiates the motion planner. Problems of high-speed coordination of motion control of a large number of remote drives with other aspects of the control program, normally a simple matter when both are handled within the controller, may be addressed (1) through a peer-to-peer communication system allowing drives to receive data directly from other components without the intermediary of the controller, and (2) by a special high-speed event messages communicating between the drive and the controller for standard motion events and (3) by creating novel completion-of-motion instruction events communicating completion of the motion by the drive.

These particular objects and advantages may apply to only some embodiments falling within the claims and thus do not define the scope of the invention.

DETAILED DESCRIPTION OF THE PREFERRED EMBODIMENT

Figure 1:
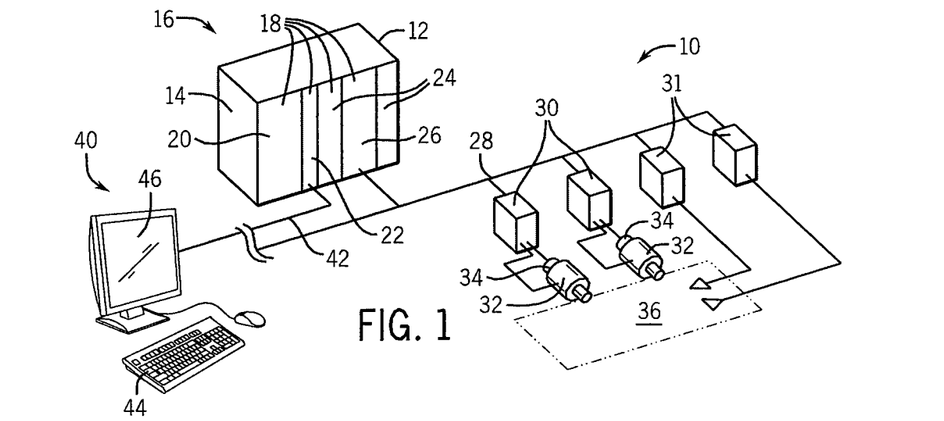
FIG. 1 is a simplified perspective view of an industrial control system having a controller communicating with multiple remote motor drives over a communication network, further showing a connecting configuring computer terminal.

Referring now to FIG. 1, an industrial control system 10 may include an industrial controller unit 12 providing generally a housing 14 having a bus 16 providing intercommunication between multiple modules 18 installed in the housing 14. The modules may include, for example, power supply module 20, a controller 22, one or more I/O modules 24, and the network component 26. The network component 26, or the controller 22, may communicate on an industrial control network 28 of a type providing connected messaging providing assurances of message completion time, low latency, and lost message detection, for example, ControlNet or EtherNet/IP, well-known open standards.

The industrial control network 28 may join industrial controller unit 12 to remote I/O modules (not shown) and one or more remote motor drives 30, the latter which may communicate with corresponding electric motors 32 and position sensors 34 to provide for controlled motion of the electric motors 32 and thereby to control associated industrial machinery or processes 36. The network 28 may also join with other devices 31, for example, standard I/O modules providing, for example, output cam functions (output signals based on the position of a remote motor 32) or registration inputs functions (input signals based on alignment of mechanisms driven by motors 32) or PWM or PTO outputs, as well as high-speed counter inputs, encoder inputs, camera inputs and encoder outputs.

A configuration computer 40 may communicate with the controller 22 and/or the motor drives 30 over the industrial control network 28 or via a dedicated communication channel 42, for example, connecting with the controller 22. The configuration computer 40 may be a standard desktop or laptop computer and include a keyboard 44, display screen 46, and the like to permit the entry and display of data and the operation of a configuration program by a human operator as will be described below.

Figure 2:
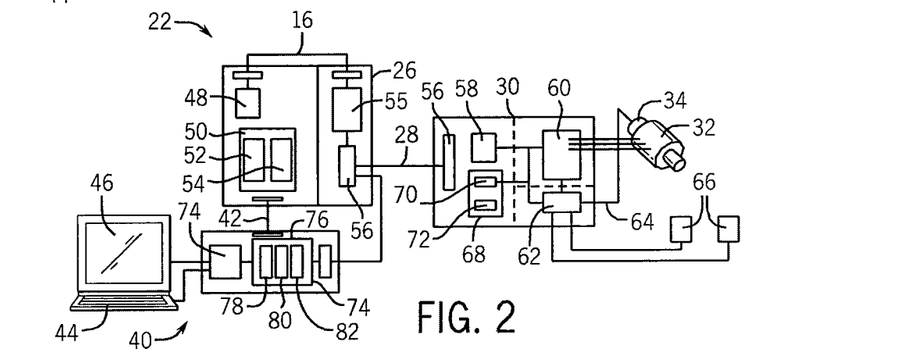
FIG. 2 is a block diagram of the components of the industrial control system of FIG. 1 showing multiple interacting processors of various components executing stored programs in a distributed fashion.

Referring now to FIG. 2, controller 22 may include a processor 48 communicating with a stored memory 50 to execute an operating system program 52 generally controlling the operation of the controller 22, and a control program 54, the latter describing a desired control of the industrial machinery or processes 36 and typically unique to a given application of the industrial control system 10. The memory 50 may also include data tables, for example, I/O tables and service routines (not shown in FIG. 2) as used by the control program 54 and as will be described below.

Controller 22 may communicate over the backplane or an inter-processor communications bus 16 with the network component 26, the latter including operating circuitry 55 (for example being a processor and a stored program and/or dedicated circuitry such as a field programmable gate array). The operating circuitry 55 may communicate with network interface circuitry 56, the latter providing for execution of low-level electrical protocols on the industrial control network 28.

Similar network interface circuitry 56 may be provided in the motor drives 30 to communicate with an internal motor control processor 58 that may for example execute a servo controller or frequency control algorithm. The internal processor 58 may also communicate with switching circuit 60 and I/O circuit 62. This switching circuit 60, for example, may provide for pulse width control or similar outputs to provide direct electrical power driving coils of the motor 32, according to methods well known in the art. The switching circuit 60 generally includes a motor control function determining control parameters for the motor and solid-state devices and drivers that may synthesizes a voltage, for example one or multiple AC voltage waveforms, that may connect to the motor windings providing power to the motor that controls motor position, torque, speed or the like. The I/O circuits 62 may receive feedback signals 64 from sensors 34 on the motors 32 (for example from encoders or the like) and may also receive other inputs, for example, from other machine-based sensors 66, for example, providing registration sensors, limit switches, optical interrupters or the like.

The processor 58 may further communicate with a memory 68 holding an operating system program 70 and downloaded program elements 72 of control program 54 as will be described below.

As noted above, the configuration computer 40 may be a standard desktop computer having a processor 74 communicating with a memory 76, the latter holding an operating system program 78 as well as various data structures and programs 80, including programs 82 used to configure the industrial control system 10 and the preparer control program as fully described below. The computer 40 may also provide for interface circuits communicating between the processor 74, for example, and the industrial network 28 or a separate communication channel 42 to the controller 22, as well as with the screen 46 and keyboard 44 according to methods well known in the art.

Figure 3:
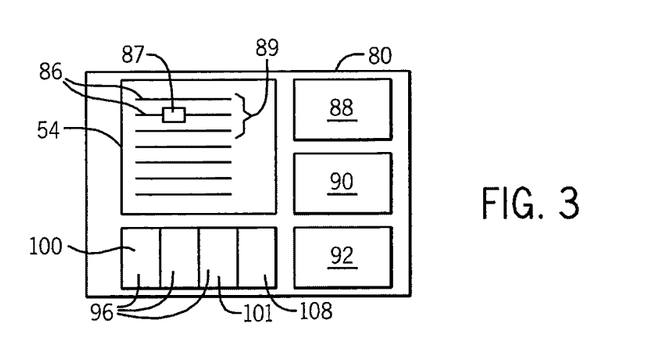
FIG. 3 is a memory map of programs including a configuring program and data structures used by the configuring computer terminal in configuring the industrial control system of FIG. 1.

Referring now to FIG. 3, the data structures and programs 80 in the computer 40 may include a copy of control program 54, the latter having multiple control instructions 86 including motion instructions 87. Generally the control instructions may be, for example, instructions implementing timers, logic gates, flip-flops, counters, arithmetic operations, and the like expressed in a variety of different languages including relay ladder language, function block language and structured text language, all well known in the art. The motion instructions may include move instructions controlling movement of a motor 32, for example, between a first and second position under constraints such as maximum velocity, acceleration and jerk, jog instructions causing movement of the motor at a predetermined velocity, and coordinated motion instructions providing movement of a motor 32 in synchrony or at a predetermined ratio or other functional relationship to a second motor as determined by a cam instruction or gear instructions. Generally, each of these instructions implements a motion profile defining a series of motion positions and times generated by a motion planner as will be discussed below.

The data structures and programs 80 in computer 40 may also include a hardware table 88 describing capabilities of the various components of the industrial control system 10, for example, including the capabilities of each motor drive 30, the I/O modules 24, and the controller 22. In particular with respect to the motor drives 30, hardware table 88 will indicate whether the motor drives 30 have the capability of receiving downloaded portions of the control program 54 and executing the portions including the ability to perform motion planning for motion instructions. Generally this information is entered by the user by selecting among a menu of predefined hardware types based on knowledge of the components of the industrial control system 10; however, this information may also be pulled from the devices themselves.

The data structures and programs 80 may also include a connection list 90 describing connections between the devices (including, for example, each motor drive 30, the controller 22, and I/O modules 31) of the industrial control system 10 according to the conventions of connected messaging. Generally each connection represents a preallocated portion of the industrial control network 28. These connections are normally based on data entered by the user indicating the originator and target for each connection. The connection list 90 may also describe a desired bandwidth of the connection, for example, defining an update rate of data transmitted over the connection.

The data structures and programs 80 may also include an association list 92 associating input and output tags in the control program 54 (representing variables used in the control program 54 as reflected by data received from sensors and outputs to actuators and motors) to particular hardware elements as assigned by the user. Thus, for example, the tags associated with sensors 66 (shown in FIG. 2) may be associating to a motor drive 30 physically connected to the sensor 66.

The data structures and programs 80 may also include various, functions, tasks or services 96 used to execute the instructions of the control program 54. These functions tasks or services 96 are normally stored in firmware in the controller 22 and include functions 101 implementing instructions 86 of the control program 54 as well as services called by those functions, for example a motion planner 100 invoked by the functions 101 implementing the motion instructions 87. The motion planner 100 when called by the functions 101 generates a motion profile of a time series of motion data (e.g. positions, velocities, or the like). Other functions, tasks, or services 96 include a communication service 108 handling communication between the controller and the various devices. These functions, tasks, or services 96 are normally part of the native environment of the controller 22 although they may be updated periodically outside of the normal process of developing control programs.

Figure 4:
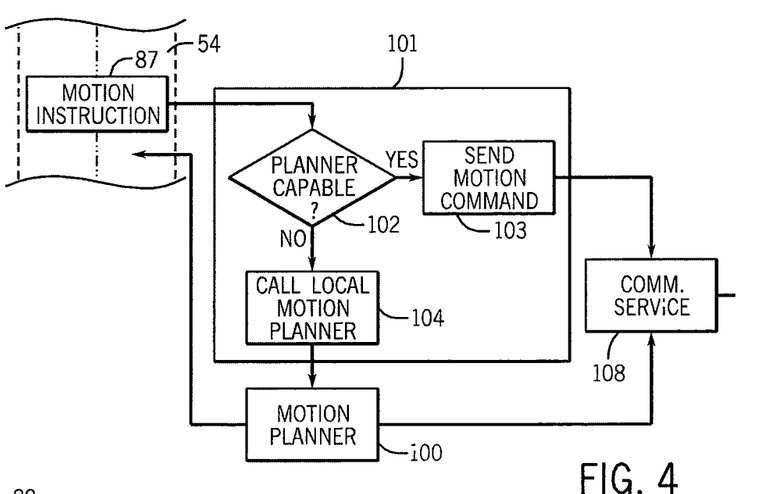
FIG. 4 is a flowchart showing a motion planner invoked by functions implementing motion instructions.
Figure 7:
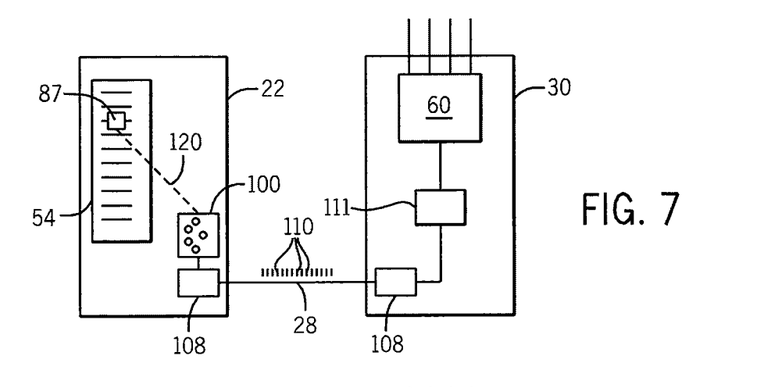
FIG. 7 is a flowchart similar to FIG. 4 showing the establishment of peer-to-peer communications for distributed motion.

Referring now to FIGS. 3, 4 and 7, during execution of a motion instruction 87 in the control program 54, a call is made by the instruction 87 to function 101 implementing instruction 87 in the hardware of the controller 22. In the present invention, the functions 101 implementing motion instructions are modified to include decision block 102 to determine whether the motor drive 30 associated with the motion instructions 87 per the association list 92 has the capability of executing a motion planner 100 and/or logic instructions.

If not, the configuration program 82 proceeds to process block 104 and the local motion planner 100 is invoked. The motion planner 100, based on the parameters passed from the motion instruction 87, then generates a series of motion data 110 to the communication service 108 which sends the time series of motion data 110 to the motor drive 30 over the industrial network 28. This time series of motion data 110 is sent at a coarse update interval which may be on the order of milliseconds and is received by a corresponding communication service 108 at the motor drive 30 which provides it to a fine interpolator 111 which interpolates a high-resolution motion profile from the motion data 110 having a fine update interval on the order of a hundred microseconds. Data from the fine interpolator 111 is provided to the switching circuit 60 which, as described above may provide a motor control algorithms and solid-state devices for and drivers for synthesizing the necessary waveforms driving the motor 32 and implements feedback control routines based on information from feedback sensors 34, for example, using a PID control algorithm.

Figure 8:
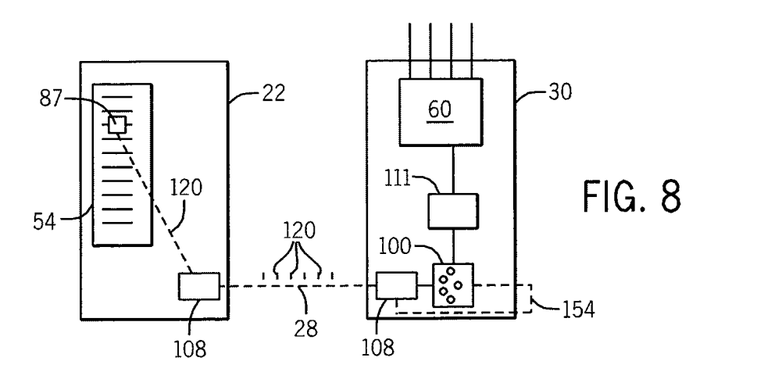
FIGS. 8-9 are simplified diagrams of the controller with one motor drive showing different allocations of a motion planner and motion instructions according to the execution of the program of FIG. 4 by the configuring computer terminal.

Referring now to FIGS. 3, 4 and 8, if at decision block 102, it is determined that the motor drive 30 associated with the motion instruction 87 includes a motion planner, the configuration program 82 proceeds to decision block 103 which sends the motion command 120 (representing generally the same data that was sent to the local motion planner 100 above) directly to the communication service 108 which forwards this motion command 120 directly to the drive 30. The motion command 120 is sent over a connection that runs at a much slower rate than the coarse update rate and may be generally sent on an event driven basis as will be described below. The use of the relatively low bandwidth (low connection update rate) transmissions for motion commands 120 substantially lessens the demand on the industrial control network 28 and on the controller 22 (which does not need to run a motion planner 100) and its communication services 108 increasing the number of axes (motors 32) that can be handled by the control system 10.

Figure 5:
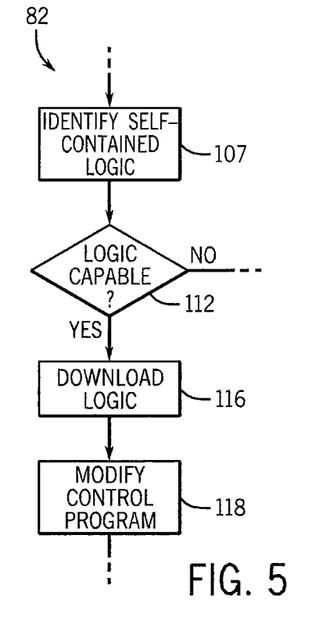
FIG. 5 is a flowchart of the execution of a motion instruction in the control program showing modification of the internal realization of that function per the present invention.
Figure 9:
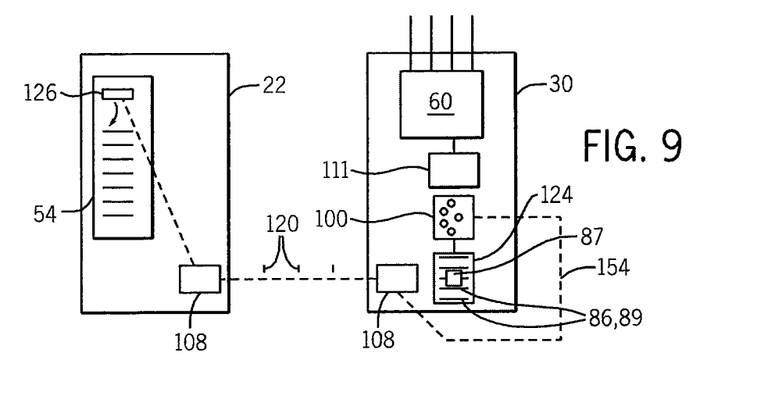

While moving the function of the motion planner 100 to the motor drive 30 greatly simplifies the task of the controller 22, additional modifications may be necessary or helpful to reduce collateral increases in network traffic caused by this movement. Referring to FIGS. 3, 5 and 9, some additional traffic may be generated because of close coupling between motion instructions 87 and other instructions 86 in the control program 54. This coupling can be manifest in additional network traffic and in undesirable process delays if rapid communication of inter-instruction communication is delayed. Accordingly, the configuration program 82 may review the instructions 86 of the control program 54 as part of the configuration process to identify motion instructions 87 and optionally to identify user or machine-demarcated associated logic instructions (linked non-motion instructions 89) that are substantially self-contained in execution with one or more motion instruction 87 for a given axis (motor 32). These linked non-motion instructions 89 will be those whose execution rely for their arguments on outputs of the motion instructions 87 and that provide outputs that govern the execution of the motion instructions 87 and thus can be readily segregated from the rest of the control program 54. In a more expansive option, these linked non-motion instructions 89 may receive inputs and provide outputs that are local to the motor drives 30 handling the associated motion instructions 87 as determined from the association list 92. In a further more expansive option, these linked non-motion instructions 89 may receive inputs and provide outputs to other devices such as other motor drives 30 through a peer-to-peer connection as will be described below.

Referring still to FIGS. 3, 5 and 9, when a motion instruction 87 or multiple linked non-motion instructions 89 are identified, per process block 107, the configuration program 82 proceeds to decision block 112 to determine whether the motor drives 30 associated with the motion instructions 87 per the association list 92 have the capability of executing a motion planner 100 and/or execution of logic instructions.

If not, the configuration program 82 proceeds to other configuration tasks, otherwise at process block 116, process block 124 containing both motion instructions 87 and arithmetic/logic instructions 86 of the linked non-motion instructions 89 is transferred to the motor drive 30 together with the configuration of any necessary services for coordination of the execution of the motion instructions 87 and arithmetic logic instructions 86 in the motor drives 30. The control program 54 downloaded to the controller 22 is modified, per process block 118, to remove (or insert a proxy for) those instructions of the process block 124 since these instructions are to execute in the motor drive 30, where the proxy provides for real-time program flow animation or the like to the user for debugging purposes at the controller 22.

Figure 6:
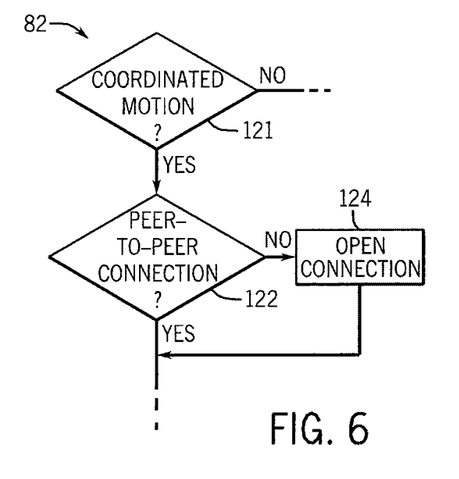
FIG. 6 is a flowchart of operation of a configuration program in distributing logic instructions closely related to distributed motion instructions.
Figure 12:
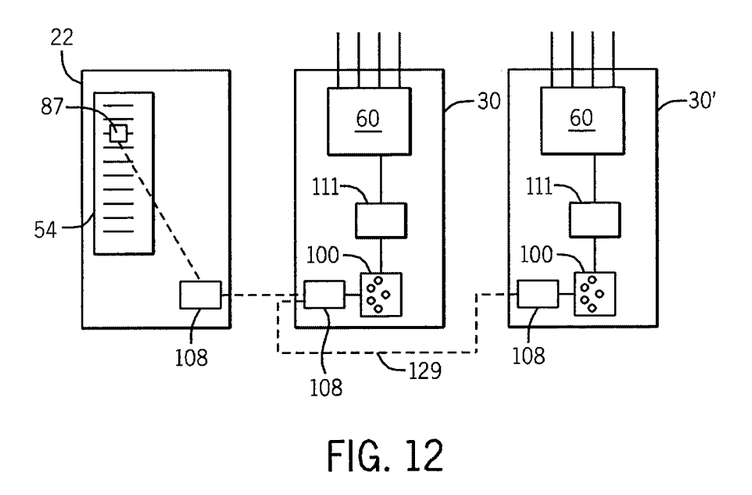
FIG. 12 is a figure similar to that of FIG. 8 showing a peer-to-peer communication that may be implemented by the configuration program of FIG. 6.

Referring now to FIGS. 6 and 12, in both cases where motion instruction 87 alone or motion instructions 87 and linked non-motion instructions 89 are transferred to the motor drive 30, the configuration program 82 proceeds to decision block 121 to identify whether the motion instruction 87 implies coordinated motion, for example, using cam instructions or gear instructions which link the motion or other movement of motors 32 together as if connected by a shaft, gear train, or cam system. If so, the configuration program 82 checks for the necessary peer-to-peer connections 129 as previously defined by the user and stored in the connection list 90 of FIG. 3 per decision block 122 and, if not found, notifies the user or automatically establishes the necessary peer-to-peer connection to support the coordinated motion per process block 124. These peer connections 129 generally provide a connected one way communication limited to regular motion data and excluding motion commands and events. As such peer connections 129 may be readily multicast from a producing to multiple consuming devices. Peer connections 129 may be generally between non-controller devices, between controller and non-controller devices, and between controller devices, and provide for the ability to aggregate data needed exclusively for one or more consuming devices in one produced connection and multicast that data to all consuming devices.

As shown in FIG. 12, the peer-to-peer connections 129 are established between communication services 108 of two different motor drives 30 and 30' and provide ongoing data transfer without intervention of the controller 22. This direct peer-to-peer connection 129, for example, opened at process block 124 serves to significantly reduce network traffic on the industrial control network 28 and associated data processing by eliminating transfers of data up to the controller 22 and then down to the relevant motor drive 30. More generally, peer connections are one to many (multicast) hence they take up less network bandwidth in cases with one producer to many consumers than point to point connections to each consuming drive. Generally these peer-to-peer connections 129 may also be used for communication of standard I/O data handled by the motor drives 30 and 30'.

Figure 13:
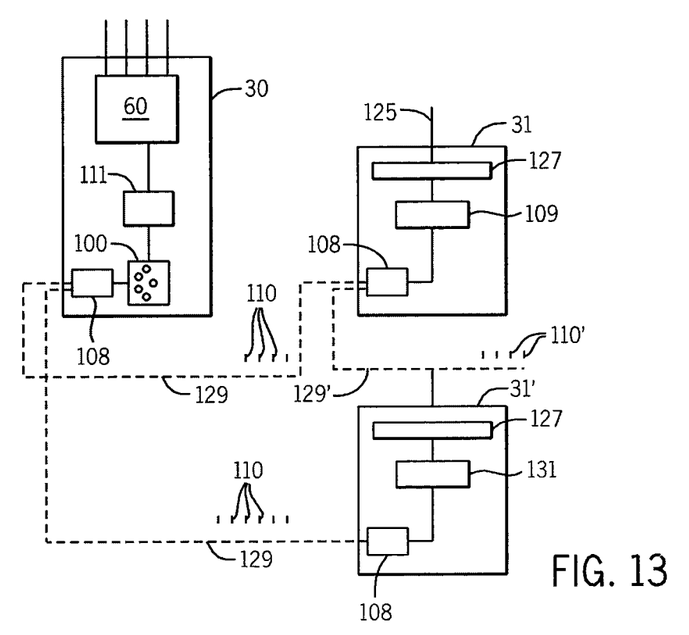
FIG. 13 is a figure similar to FIG. 12 showing peer-to-peer communication to non-drive devices.

Referring now to FIG. 13, the peer-to-peer connections 129 are not limited to communication between motor drives 30 but may also provide for communication between the motor drive 30 and other I/O devices, for example, an I/O module 31 implementing a cam output 125 based on received motion data 110 over peer-to-peer connections 129. The motion data 110 may be used by a cam function 109 generating an output 125 via standard I/O module I/O circuitry 127 based on a particular value or range of motion data 110.

Figure 15:
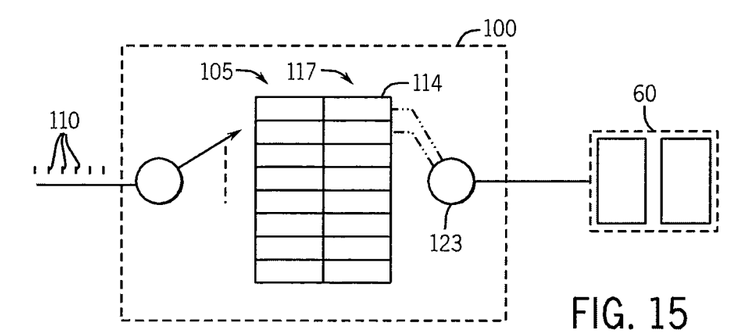
FIG. 15 is a diagram of the implementation of the camming function showing the mapping of motion data to cam motion data.

Referring momentarily to FIG. 15, the cam function 109 may receive motion data 110 and apply that motion data to a cam table 114, the latter mapping stored motion master positions 115 to cam outputs 117. Generally the cam function 109 will include an interpolator 123 interpolating between cam outputs 117 based on the current and previous master positions 115. This cam motion output 117 may then be applied to a switching circuit 60 generally including motor control functions and solid-state devices and drivers as discussed above for the generation of output signals to 32.

Figure 16:
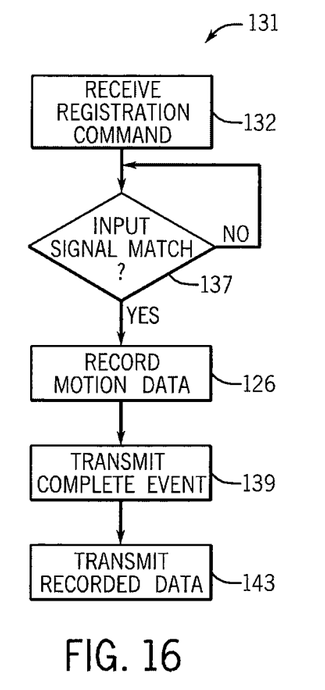
FIG. 16 is a flowchart showing implementation of a registration command at I/O module for capturing motion data on an I/O event.

More generally, the peer-to-peer connections 129 may be to an I/O module 31' implementing a registration instruction or watch instruction by means of registration/watch function 131 in the I/O module 31'. Referring also to FIG. 16, the registration/watch function 131, upon receiving a registration command, for example, from the industrial controller 22, as indicated by process block 132, may monitor an input signal from the I/O circuitry 127 for a predetermined pattern in that input signal as indicated by process block 137. The pattern may for example be simultaneous data values or a sequence of data values. The particular pattern may be incorporated into the registration command (as an argument or parameter) or may be pre-sent, for example, from the industrial controller 22 for transmission of the registration command.

When the pattern is matched, as indicated by process block 137, the registration/watch function 131 captures motion data received over the peer connection. Upon conclusion of this capture, a registration completion event 154 (as will be described in more detail below) may be returned to the controller 22 as indicated by process block 139 together with the captured data indicated by process block 143.

Figure 17:
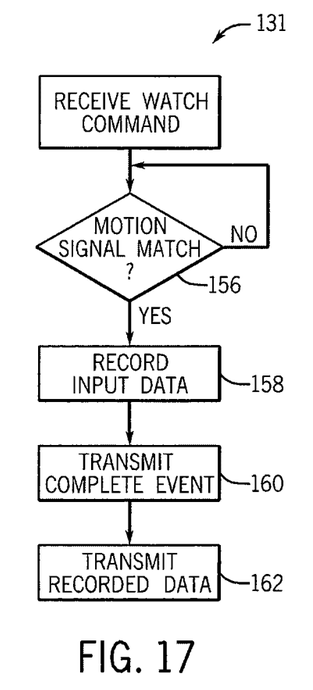
FIG. 17 is a flowchart showing implementation of the watch command at an I/O module for capturing I/O data based on motion events.

Alternatively and also referring to FIG. 17, the registration/watch function 131 may receive a watch command (for example from the industrial controller 22) as indicated by process block 155 and may monitor motion data value received over the peer connection to cross a predetermined threshold as indicated by process block 156. The particular threshold may be incorporated into the watch command or may be pre-sent, for example, from the industrial controller 22 as described above. When the threshold value is crossed as indicated by process block 158, the registration/watch function 131 captures input data received from I/O circuitry 127 per process block 158. Upon conclusion of this capture, a watch completion event 154 is again returned to the controller 22 as indicated by process block 160 together with the recorded data indicated by process block 162.

In all these cases, the I/O module 31 and 31' may receive the motion data 110 from the controller 22 or from a peer device such as a motor drive described above over a peer connection. By distributing the registration command or watch command, the need to transfer perform registration and watch functions in the controller is eliminated.

Figure 10:
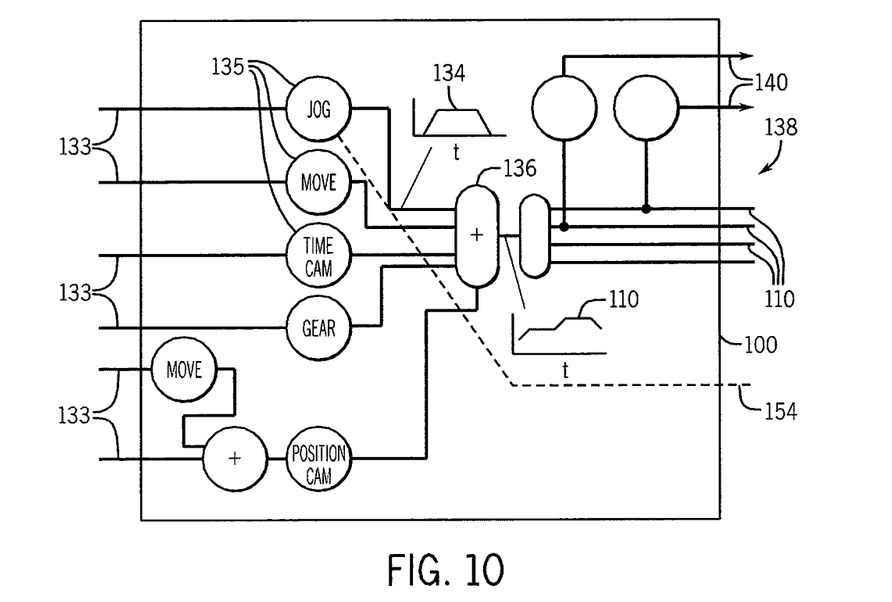
FIG. 10 is a functional block diagram of the motion planner of FIG. 4.

Referring now to FIG. 10, the motion planner 100 that may be used by the controller 22 or selected motor drives 30 incorporates all the programming necessary to generate the time series motion data 110 from the parameters of various motion instructions 87 (received schematically as shown in FIG. 10) by inputs 133. Generally each motion instruction 87 may invoke a separate motion generator 135 associated with that instruction 87 executing a motion profile 134 describing a desired motion as a function of time. These motion profiles 134 for different instructions may be added together by an adder 136 and output as a time series of motion data 110 in any one of the forms generally including: motor position command, motor velocity command, and motor acceleration command via outputs 138.

In the case of coordinated motion instructions, where the given motion planner 100 represents a master axis, the outputs 138 may be applied to inputs 133 to the gear or position cam generators 135 of motion planner 100 of controller 22 that sends its outputs 138 to slave axes in other drives 30. Alternatively, the master axis outputs 138 may be transmitted over peer-to-peer connection 129 described above with respect to process block 130 directly to the motor drive 30 of the slave axes when equipped with motion planner 100. In the case where output camming relationships are established for a master axis, the motion planner 100 for the master axis also provides for cam outputs 140 providing a desired functional relationship between the planner command outputs 138 and the cam outputs 140.

Upon completion of each motion profile 134 with respect to each motion generator 135 operating in the motor drive, a motion completion event 154 may be generated for transmission back to the industrial controller as will be described below.

By moving the motion planner 100 to motor drives 30, the industrial control network 28 may be preferentially used for the relatively low bandwidth communication of motion planner calls by motion instructions 87 and steered away from the high data rates of the time series motion data 110.

Figure 11:
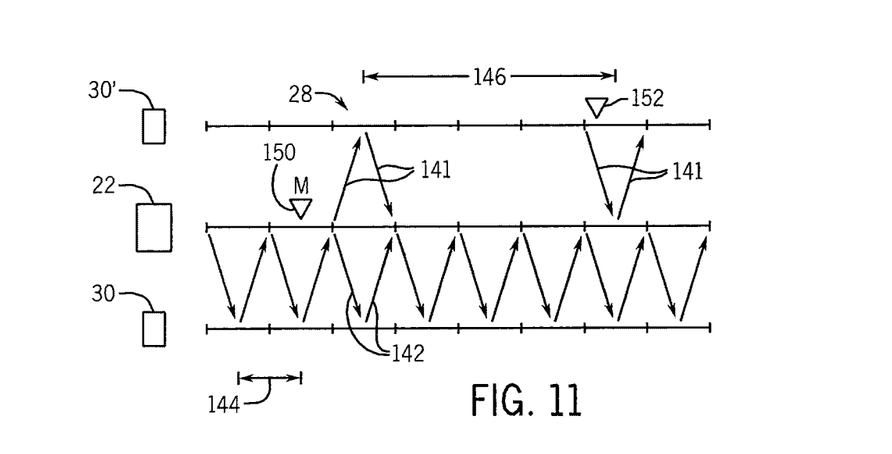
FIG. 11 is a communication timing diagram showing intercommunication between the controller of FIG. 1 and two different motor drives according to capabilities of each drive for receiving motion planning or motion instruction downloads.

Referring now to FIG. 11, the present invention more generally allows for improved bandwidth utilization of the network 28 by using different bandwidth connections for different motor drives 30. This adjustment of the bandwidth between the controller 22 and the motor drives 30 may be done not only when the motion planner 100 is moved to a motor drive 30 but also where the motion planner 100 is retained in the controller 22 with different resolution requirements for motion profiles 134 (shown in FIG. 10).

As discussed above, generally a coarse update rate 144 is used for the transmission of motion data 110 (shown in FIG. 7) in bidirectional messages 142 between the controller 22 and a typical motor drive 30 that does not support the motion planner 100. Conversely, a "dynamic update rate" 146 may be used for the transmission of motion data 110 in bidirectional dynamic-rate packets 120 between the controller 22 and the motor drives 30' of the present invention that supports motion planner 100 and thus need not transmit high frequency time domain motion data 110 but only motion commands 120. This dynamic update rate 146 is substantially slower on average than the coarse update rate 144.

Despite the relatively low bandwidth requirements between the controller 22 and motor drives 30', it is nevertheless important that the execution of motion instructions 87 be prompt. The dynamic update rate 146 resolves this tension between a low average bandwidth usage and the need for prompt communication for certain events by providing an event driven dynamic packet transfer mechanism that can respond to time critical "events" by the introduction of a new dynamic rate packet pair 141.

Thus, for example, communication between the controller 22 and a motor drive 30' using the dynamic update rate 146 (representing an average bandwidth usage) may insert an event driven dynamic-rate packet 141' on-demand, for example, when a motion command call 150 occurs generated by the controller 22 or a drive event 152 occurs generated by the drive 30'. The drive events 152 may be time critical data generated by the drive, for example, indicating a registration position of a motor 32 (deduced from the sensor 34 shown in FIG. 1) has been reached by the drive. Such registration information needs to be communicated quickly to trigger other logical and motion instructions.

Referring to FIGS. 7, 8 and 11, the present invention also provides an additional drive event 152 in the form of a motion completion event 154 indicating completion of a motion planning service for a given motion instruction 87 when the motion planner 100 is remotely located in the drive 30. This motion completion event 154 is generated by the motion planner 100 in the drive 30 and returned to the controller 22. Like the drive event 152, the motion completion event 154 triggers an extra dynamic-rate packet pair 141 to signal the controller 22 that the motion instruction 87 is complete for instructions 86 of the control program 54 that are contingent upon completion of the motion instruction 87. Dynamic-rate packets 120 are implemented in the context of a connected messaging system by exploiting the ability of such connected messaging systems to accommodate within a given bandwidth connection an average bandwidth that fluctuates about this average.

As noted above, it will be appreciated that the dynamic-rate packet pair 141 can also be used in cases where motion data 110 is being transmitted from the controller 22 to multiple motor drives 30 but is required by different axes represented by the motor drives 30 at different rates. That is, some axes may require less precise control or less frequent updating. In this case the use of the dynamic-rate packets 120 plus the event triggering can increase effectiveness of bandwidth utilization of the industrial control network 28.

Figure 14:
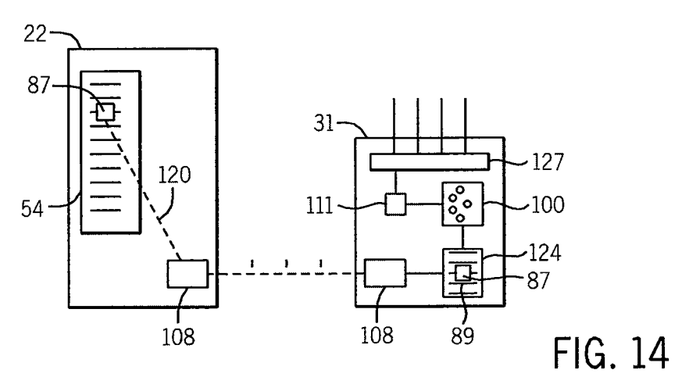
FIG. 14 is a figure similar to FIG. 9 showing downloading of motion instructions and a motion planner two I/O module that does not have motor drive capabilities but which may provide for motor control using a PWM or PTO output.

Referring now to FIG. 14, the downloading of motion instructions 87 and the motion planner 100, for example, as described above with respect to FIG. 9 may also be implemented in I/O modules 31 that do not have conventional motor drive capabilities provided by the switching circuit 60 which may synthesize high-power motor drive signals directly driving motor coils. Instead these I/O modules 31 may have standard low-power output circuits that may produce a pulse width modulated (PWM) or pulse train output (PTO) signals that may be provided to, for example, a stepper motor driver receiving a direction signal and a pulse train to operate a stepper motor or to a torque motor driver or the like receiving a pulse width modulated or analog signal to control electrical power to a motor. In this case, as in the case described above with respect to FIG. 9, a motion instruction 87 and/or multiple linked non-motion instructions 89 are identified, per process block 107 of FIG. 5, and at decision block 112 is determined whether the I/O module 31 associated with the motion instructions 87 per the association list 92 have the capability of executing a motion planner 100 and/or execution of logic instructions.

If not, the configuration program 82 proceeds to other configuration tasks, otherwise at process block 116, process block 124 containing both motion instructions 87 and arithmetic/logic instructions 86 of the linked non-motion instructions 89 is transferred to the I/O module 31 together with the configuration of any necessary services for coordination of the execution of the motion instructions 87 and arithmetic logic instructions 86 in the motor drives 30. The control program 54 downloaded to the controller 22 is modified, per process block 118, to remove (or proxy) those instructions of the process block 124 since these instructions are to execute in the motor drive 30.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

The present application incorporates by reference U.S. application Ser. Nos. 13/443,623 and 13/443,537, filed on even date herewith and assigned to the same assignee as the present invention entitled: Output Module for an industrial Controller; and Input Module for an Industrial Controller.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What I claim is:

1. An industrial controller comprising:
   a network interface adapted to communicate with one or more connected motor drives;
   an electronic computer communicating with the network interface and executing a program stored in non-transient storage medium to:
   (1) receive a control program providing motion control instructions;
   (2) execute the motion control instructions by calling a function executing to distribute motion planning tasks to motion planning capable motor drives, wherein the function is stored in the industrial controller independent of the control program so that the function can be called by different control programs, the function operable to:
   (a) identify a motor drive associated with the motion control instruction; and
   (b) determine whether the identified motor drive is capable of executing a motion planner, which provides a time series of motion data for controlling a motor when initiated by a motion command caused by execution of a motion control instruction, and if capable, transmit the motion command to the identified motor drives over the network interface to the identified drive, otherwise transmit the motion command to a motion planner in the industrial controller.

2. The industrial controller of claim 1 wherein the functions and motion planner are stored in firmware in the industrial controller.

3. The industrial controller of claim 2 wherein the network interface is adapted to implement connected messaging between the controller and the motor drives pre-allocating network communication capacity among connections and wherein the electronic computer executes the stored program to open connections between the controller and the drives for communication of motion commands or motion data.

4. The industrial controller of claim 3 wherein the electronic computer executes the stored program to allocate a first portion of the network communication capacity to communication with a motor drive capable of executing a motion planner less than a second portion of the network communication capacity allocated to communicate with a motor drive not capable of executing the motion planner.

5. The industrial controller of claim 4 wherein the first portion of the network communication capacity is periodic a first predefined interval of time and event driven according to triggered by a generation of the motion command and the second portion of the network communication capacity is periodic according to a second predefined interval of time less than the first predefined interval of time.

6. The industrial controller of claim 5 wherein the controller includes a drive profile indicating whether each motor drive includes a motion planner in firmware and then determining whether the identified motor drives capable of executing a motion planner refer to the drive profile.

7. The industrial controller of claim 6 wherein the motion planner sums generated motion profiles from motion commands to provide time series of motion data for controlling a motor being a summation of multiple motion profiles.

8. The industrial controller of claim 7 wherein the motion instructions include instructions for moving a motor between defined positions, instructions for moving a motor at a defined velocity, and instructions for moving a motor in coordination with another motor.

9. The industrial controller of claim 8 wherein the control program is a program generated using a programming language selected from the group consisting of relay ladder logic, structured text, and a sequential function chart.

10. A motor drive comprising:
a switching circuit for synthesizing power voltage to a motor;
a network interface for communicating with an industrial controller;
an electronic computer communicating with the switching circuit and the network interface and executing a program stored in non-transient storage medium to:
(1) receive a motion command from an industrial controller over the network interface, the motion command indicating execution of a motion instruction by the industrial controller;
(2) in response to the motion command, generate time series of motion data for the switching circuit using a motion planner; and
(3) after generation of the time series of motion data for the switching circuit using the motion planner communicate with the industrial controller a motion completion signal indicating completion of the motion command to the industrial controller.

11. The motor drive of claim 10 wherein the motion planner is stored in firmware in the motor drive.

12. The motor drive of claim 11 wherein the network interface is adapted to implement connected messaging between the motor drive and the controller pre-allocating network communication capacity among connections and wherein the electronic computer executes the stored program to receive a connections between the controller and the drive for communication of motion commands or motion data.

13. The motor drive of claim 12 wherein the motion planner sums generated motion profiles from motion commands to provide time series of motion data for controlling a motor being a summation of multiple motion profiles.

14. The motor drive of claim 12 wherein the electronic computer further executes the stored program to implement one-way connected messaging with another device to produce time series of motion data from the motor drive to the other device.

15. The motor drive of claim 14 wherein the other device is selected from the group consisting of: a controller, another motor drive, and an I/O module.

16. The motor drive of claim 12 wherein the connection is aperiodic to provide a short term data transfer rate as fast as a periodic data transfer rate of the time series of motion and a long term data transfer rate less than the periodic data transfer rate of the time series of motion.

17. The motor drive of claim 10 wherein the electronic computer further executes the stored program to load and execute instructions from a control program that are not motion instructions.

18. An output module comprising:
electrical outputs adapted for connection to external equipment;
a network interface for communicating with other devices;
an electronic computer communicating with the electrical outputs and the network interface and executing a program stored in non-transient storage medium to:
(1) receive over the network interface, motion data providing a time series of data values representing motion of a device;
(2) receive over the network interface an output camming command from an industrial controller over the network interface;
(3) in response to the ramming command, generate at an electrical output, cam data providing a time series of data values representing a cycle of desired motion of a device, the cam data based on the received motion data and a cam function held in the output module mapping motion data to cam data; and
(4) after generation of the cam data providing the time series of data values representing a cycle of desired motion of a device, send a completion signal to the industrial controller over the network interface indicating completion of the ramming command to the industrial controller.

19. The output module of claim 18 wherein the cam function is stored in firmware in the device.

20. The output module of claim 18 wherein the network interface is adapted to implement connected messaging between the output module and the industrial controller and wherein the electronic computer executes the stored program to open connections between the industrial controller and the output module for communication of motion data and ramming commands over the connection.

21. The output module of claim 18 wherein the electronic computer further executes the stored program to load and execute instructions from a portion of a control program.

22. The output module of claim 18 wherein the electronic computer further executes the stored program to implement connected messaging with a non-controller device to share a time series of motion data between the output module and another non-controller device.

23. The output module of claim 22 wherein the non-controller device is selected from the group consisting of: a motor drive and an I/O module receiving an encoder signal input device.

24. The output module of claim 18 wherein the connection is aperiodic to provide a short term data transfer rate as fast as a periodic data transfer rate of the time series of motion and a long term data transfer rate less than the periodic data transfer rate of the time series of motion.

25. An input module comprising:
electrical inputs adapted for connection to external equipment to receive electrical signal therefrom;
a network interface for communicating with other devices;
an electronic computer communicating with the electrical inputs and the network interface and executing a program stored in non-transient storage medium to:
(1) receive over the network interface motion data providing a time series of data value representing motion of the device and a registration command;

(2) in response to a registration command control a recording of motion data based on a predetermined state of an electrical signal from an electrical input;
(3) after recording of motion data based on the predetermined state of the electrical signal from the electrical input, send a completion signal to the industrial controller over the network interface, with the recorded motion data, indicating completion of the registration command to the industrial controller.

26. An input module comprising:

electrical inputs adapted for connection to external equipment to receive electrical signal therefrom;

a network interface for communicating with other devices;

an electronic computer communicating with the electrical inputs and the network interface and executing a program stored in non-transient storage medium to:

(1) receive over the network interface motion data providing a time series of data value representing motion of the device and a watch command;
(2) in response to the watch command, control a recording of an electrical signal from an electrical input based on a predetermined state of the motion data;
(3) after recording of the electrical signal from the electrical input based on the predetermined state of the motion data, send a completion signal to the industrial controller over the network interface, with the recorded electrical signal, indicating completion of the watch command to the industrial controller.

* * * * *